United States Patent [19]

Kolarik et al.

[11] Patent Number: 5,275,337
[45] Date of Patent: Jan. 4, 1994

[54] HIGH PRESSURE LIMITING VALVE WITH FAST RESPONSE AND FUEL INJECTOR EQUIPPED THEREWITH

[75] Inventors: Oldrich S. Kolarik, Summerville, S.C.; Jeffery L. Campbell, Hope, Ind.

[73] Assignee: Cummins Engine Company, Inc., Columbus, Ind.

[21] Appl. No.: 898,818

[22] Filed: Jun. 15, 1992

[51] Int. Cl.$^5$ .................... F16K 7/02; F16K 31/126; F16K 31/72; F02M 61/04
[52] U.S. Cl. ......................... 239/91; 239/95; 137/853; 137/860
[58] Field of Search ............... 239/88, 91, 95, 533.8; 137/853, 860

[56] References Cited

U.S. PATENT DOCUMENTS

| | | |
|---|---|---|
| 233,432 | 10/1880 | Pitchford . |
| 2,590,575 | 3/1952 | Rogers ........................... 239/88 X |
| 2,671,466 | 3/1954 | Conrad ........................... 137/860 X |
| 4,095,617 | 6/1978 | Hodgson . |
| 4,194,435 | 3/1980 | Gaun et al. . |
| 4,565,320 | 1/1986 | Taniguchi et al. ............... 239/88 X |
| 4,576,338 | 3/1986 | Kromp ........................... 137/853 X |
| 4,708,156 | 11/1987 | Knudsen . |
| 4,721,247 | 1/1988 | Perr . |
| 4,986,472 | 1/1991 | Warlick et al. . |
| 5,014,918 | 5/1991 | Halvorsen . |
| 5,056,488 | 10/1991 | Eckert ........................... 239/88 X |
| 5,209,403 | 5/1993 | Tarr et al. ..................... 239/95 X |

*Primary Examiner*—Andres Kashnikow
*Assistant Examiner*—William Grant
*Attorney, Agent, or Firm*—Sixbey, Friedman, Leedom & Ferguson

[57] ABSTRACT

A pressure responsive spring valve which is able to function at high pressures and temperatures, and can attain a high degree of precision control in a minimum of space, as well as an improved high pressure fuel injector for internal combustion engines which uses such a spring valve to achieve the demanding performance characteristics of the more complex new injector designs within limited space requirements. In all cases, a band-like spring valve member is used to reduce the number of parts and the space requirements therefor relative to that required for a coil spring type pressure control valve. Furthermore, whether a split or continuous ring type spring member is used, in accordance with preferred embodiments, by giving the spring member a configuration which is different from that of the circumferential wall of the valve body on which it sits, while producing a matching of their surfaces in the area of the outlet port(s) of the valve member, higher pressures and precision factors are achieved since the spring force of the spring member is concentrated at the port area(s).

45 Claims, 8 Drawing Sheets

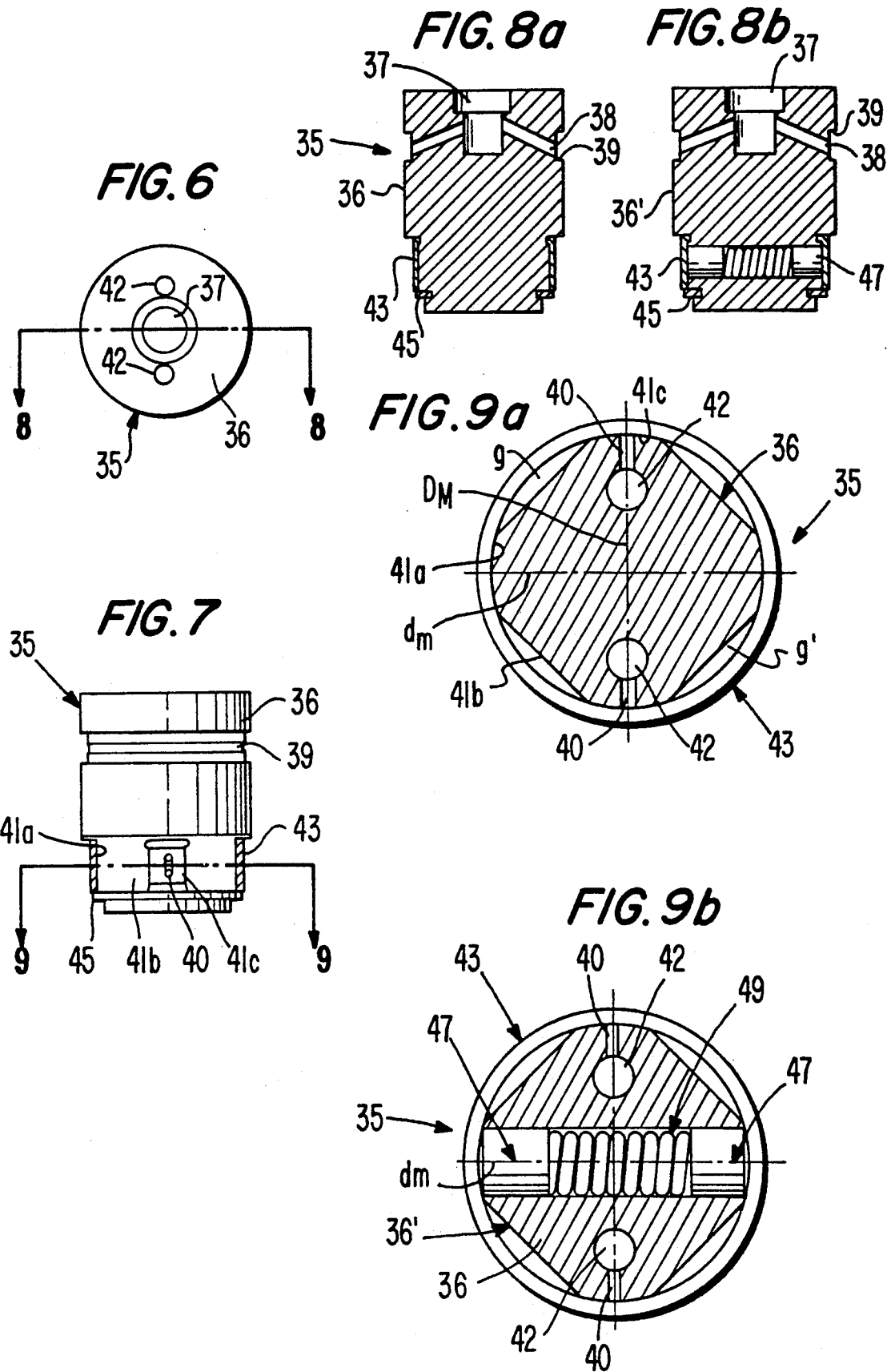

HIGH PRESSURE LIMITING VALVE WITH FAST RESPONSE AND FUEL INJECTOR EQUIPPED THEREWITH

BACKGROUND OF THE INVENTION

1. Field of the Invention

The present invention is related to the field of pressure responsive valves, particularly those as used in fuel injectors for internal combustion engines for draining of fuel and timing fluid when predetermined fluid pressures are exceeded, and as is used in other applications where fast, predictable response times and minimum space requirements are prime considerations.

2. Description of Related Art

The competing demands for increased fuel economy and improved pollution control has led internal combustion engine designers to give increased attention to improvements in fuel supply systems, particularly fuel injection systems. However, these efforts have lead to more complex designs and more demanding performance characteristics, and has required the number of components to be increased and the size to be decreased.

For example, U.S. Pat. Nos. 4,721,247 and 4,986,472 (which are owned by the assignee of this application) address the problem of achieving the high injection pressures (on the order of 30,000 psi and above) required to reduce the levels of hydrocarbons, nitrogen oxides and particulate mass over the entire range of engine operating speeds. Furthermore, to achieve adequately high pressure at low engine speed without excessive pressures being generated at high engine speeds, the fuel injectors of these patents use a coil spring-loaded, pressure responsive valve to drain timing fluid from a timing chamber, that forms an intermediate hydraulic link in an injection plunger assembly, whenever the pressure of the timing fluid exceeds a predetermined value.

While an improvement over then existing fuel injections systems, such fuel injectors do not represent an optimized design, at least in part due to the fact that coil spring type relief valves can be subject to slow response rates resulting in pressure oscillation and valve chatter affects the ability to obtain adequate pressure regulation. Furthermore, due to the relationship between spring rate and springs size inherent in helical coil springs, the use of coil springs for the pressure responsive component of a valve imposes size constraints on the extent to which the size of a fuel injector, or any other device using such a valve, can be reduced. Also, coil springs are subject to spring relaxation which can affect the reliability of the precision pressure control achieved thereby.

Pressure responsive valves have long been known for use in a variety of environments in which a band-like spring element serves as the pressure responsive component for opening or closing a fluid port. In many cases, as shown in U.S. Pat. Nos. 4,708,156 and 4,194,435, the band member is a resiliently stretchable ring that is made of rubber or a rubber-like material and is mounted in tension over an annular surface containing at least one port. When the fluid pressure becomes great enough, it stretches the band so as to uncover the port to permit the outflow of fluid. However, such elastomeric bands cannot be subjected to either high temperatures or high pressure levels, such as those experienced in high pressure fuel injectors.

Pressure responsive control valves using band-like spring elements of metal are also known (see, for example, U.S. Pat. Nos. 233,432; 4,095,617; and 5,014,918). In the case of the air compressor of U.S. Pat. No. 233,432, a band-like ring valve is beveled at each side and is received in a beveled seat which flanks an annular opening in a circumferential wall of a compression cylinder. To allow the ring valve to expand to allow air being compressed to exit the opening, the ring is cut or split; but, to close the annular opening at the split, a joint or cover is attached to the ring, or the ends of the ring are oppositely tapered and made to overlap each other, or a double-ring arrangement, in which the cuts of the rings are on opposite sides, is provided.

In contrast, in the airblast fuel injector for gas turbine fuel injectors Of U.S. Pat. No. 5,014,918, a spring valve in the form of a cantilever reed valve is formed of a partially cylindrical, arcuate band-like member that is machined from tubing stock. The spring valve lies against the inner surface of a cylindrical seat member. One end of the spring member is attached to the seat member by set screws at an area diametrally opposite the fuel outlet port formed in the seat member.

While the band-like valve spring members of the preceding two cases may be suitable for situations in which the pressure of the fluid being regulated is not that great and/or a high degree of precision is not required, such spring members would not be able to meet the demands for precision control that are necessary in high pressure fuel injectors for internal combustion engines that are being designed to have increased fuel economy and improved pollution control characteristics because such high performance injectors require fast response times and must meet minimum space requirements. Furthermore, in comparison to a continuous annular valve spring member, such split valve spring members are more difficult to make and install.

SUMMARY OF THE INVENTION

In view of the foregoing, it is an object to provide a pressure responsive spring valve which will, on the one hand, be able to function at high pressures and temperatures, and on the other hand, will attain a high degree of precision control in a minimum of space.

A second objective of the present invention is to provide an improved high pressure fuel injector for internal combustion engines which can achieve the demanding performance characteristics of the more complex new injector designs within limited space requirements.

Another object of the present invention is to provide spring valves which are able to fulfill the preceding objects.

A still further object is to provide spring valves of the continuous and split ring types that can adjustably achieve higher degrees of precision regulation than has previously been possible.

Yet another object of the present invention is to provide a high pressure fuel injector for internal combustion engine that uses an improved valve arrangement in a way that is easier to package in the injector, especially smaller size injectors, at lower cost, while enhancing reliability and durability.

These and other objects are achieved in accordance with various embodiments of the present invention. First of all, in all cases, a band-like valve spring member is used since it reduces the number of parts and the space requirements relative to that required for a coil spring type pressure control valve. Furthermore, whether a split or continuous spring type spring member is used, in accordance with preferred embodiments, by giving the spring member a configuration which is different from that of the circumferential wall of the valve body on which it sits, while matching their surfaces in the area of the outlet port(s) of the valve member, higher and more predictably and precisely controlled operating pressures are achieved since the spring force of the ring member is concentrated at the port area(s).

In the most preferred embodiments, the spring member of the pressure responsive valve is a continuous ring and is mounted on the outside of the injector barrel. However, for lower pressure applications or designs where it is not feasible to put the ring member on the injector barrel, closed ring and split ring embodiments are provided which are mounted on the periphery of the timing plunger. In both cases, means are provided by which the pressure force can be adjusted to insure that the proper pressure level and level of precision are achieved. In the case of a split ring embodiment, the spring member is a split circular ring and the configuration of the circumferential wall of the valve body is of an at least partially convex curvature having a radius that is smaller than that of the circular ring. A mounting means is provided for mounting the split circular spring member on the valve body with its center shifted radially relative to the center of the circular shape of the circumferential wall of the valve body to an extent which produces an opening of the split ring with ends of the split ring firmly engaged on the surface area(s) containing the outlet port(s) so as to seal the at least one port formed therein. The mounting means comprises a radially inwardly directed projection extending from the spring member at a point opposite the split therein and which is received in a mounting bore formed in the valve body. An adjusting means is provided for adjusting the pressure applied by the engagement of the ends of the split ring on said surface area of the circumferential wall of the valve body in the form of a plurality of shims, a variable number of which may be disposed within the mounting bore for varying the extent to which the projection of the split circular ring is received in the mounting bore, or blocks of variable height may be used.

In one embodiment, a continuous band-like, resilient valve spring member may be provided with a circular shape and the circumferential configuration of the circumferential wall of the valve body may be square with corners in the form of convex arc segments to which the circumferential configuration of the spring member is able to match itself. At least one outlet port is provided in each of a first pair of opposite corners of the circumferential wall of the valve body. A throughhole extends between a second pair of opposite corners of the circumferential wall of the valve body, and a pin member is slidably received in the throughhole at each of these second opposite corners. A spring means is provided between the pin members for urging them outwardly into engagement with the spring member, and by selecting the force of the spring means, the precision of the pressure regulation produced by the spring member can be improved. At the same time, the force of the pin members on the spring member serves to reduce ring stresses in the spring member.

In another embodiment, the circumferential wall of the valve body, which preferably is formed by the injector body but can be the timing plunger, has an elliptical configuration and a continuous spring member is provided which has a circular circumferential configuration, the diameter of the circular configuration of the spring member being greater than that at a minor diameter of the elliptical configuration and less than that at a major diameter of the elliptical configuration. At least one outlet port is provided at each of opposite ends of the major diameter of the elliptical configuration of the circumferential wall of the valve body. The difference between the major diameter of the ellipse of the valve body and the initial diameter of the spring member before mounting thereon is used to control the preload which must be overcome for the valve to begin to open. Alternatively, instead of providing the valve body with an elliptical circumferential configuration, nonelliptical configurations may be used in which four or more flats have been cut (which may be left unfinished) and on which at least four convex arc segments are machined at points corresponding to the ends of major and minor diameters of the resultant configuration. Outlet ports are provided at the points corresponding to the major diameter in a surface area having a radius of curvature that is smaller than the half length of the major diameter, and the points corresponding to the ends of the minor diameter area on a closed surface area that has a radius of curvature that is larger than the half length of the major diameter. The flats serve to provide improved drainage and leave a clearance area between the spring member. Additionally, a clearance is left between the valve body and the spring member at the surface areas at the ends of the minor diameter into which the spring ring member can bend as the fluid pressure from the outlet ports lift the spring member. In a still further modified form, three symmetrically arranged ports can be provided instead of diametrally disposed ones with a surface area of larger radius being disposed between each pair of surface areas in which ports are provided.

These and other objects features and advantages of the present invention will become more apparent from the following detailed description of the preferred embodiments of the invention when viewed in conjunction with the accompanying drawings.

BRIEF DESCRIPTION OF THE DRAWINGS

FIG. 6 is a top plan view of another embodiment of a timing plunger in accordance with the invention;

FIG. 7 is a side elevation of the timing plunger of FIG. 6 with a spring member shown in section;

FIGS. 8a and 8b are cross-sectional views taken along line 8—8 of FIG. 6 showing two forms for the timing plunger thereof;

FIGS. 9a and 9b are cross-sectional views taken along line 9—9 of FIG. 7 and corresponding to the two forms of the timing plunger shown in FIGS. 8a and 8b.

DETAILED DESCRIPTION OF THE PREFERRED EMBODIMENTS

Figure 1:
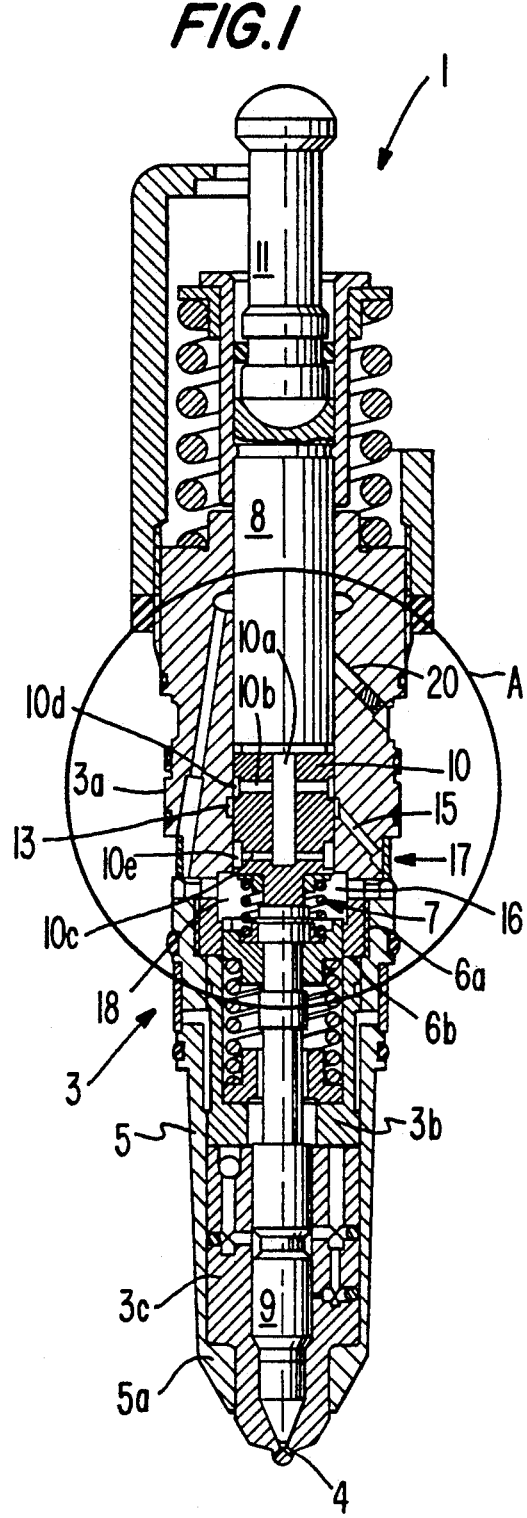
FIG. 1 is a partial cross sectional view of an open nozzle fuel injector with pressure responsive limiting valves designed in accordance with the present invention.

FIG. 1 illustrates an open nozzle unit fuel injector in accordance with the present invention, which is designated generally by reference numeral 1. The fuel injector 1 is intended to be received within a recess in the head of an internal combustion engine (not shown) in a conventional manner. The injector 1 is formed of an injector body 3, that has an upper injector barrel part 3a (the section of which is shown on the left having been taken along a plane at a right angle to the section shown at the right in FIGS. 1 and 1a-1c), a lower injector barrel part 3b, an injector cup 3c having an injection nozzle having spray orifices for spraying fuel into the combustion chamber (not shown) of an internal combustion engine, and a retainer 5 having a shoulder 5a for capturing the injector cup 3c. The retainer 5 receives the the injector cup 3c, supported on shoulder 5a with spray nozzle 4 projecting from the bottom end thereof. The lower barrel part 3b is received in the retainer 5 supported on the injector cup 3c. Furthermore, retainer 5 secures the injector cup 3c and lower lower barrel part 3b together in end-to-end fashion with the upper barrel part 3a. For this purpose, the top end of the retainer 5 has internal threads 6a by which it is connected to external threads 6b on the bottom end of upper injector body part 3a, as shown. A central bore extends through the parts 3a-3c of the injector body 3 of the fuel injector 1, and a reciprocating plunger assembly 7 is disposed in this central bore.

The plunger assembly 7 includes three plungers. An upper plunger 8, an injection plunger 9 and a timing plunger 10 disposed therebetween. The fuel injector 1 is part of a fuel injection system having a plurality of such injectors, each of which is driven by a rotating camshaft (not shown) via a conventional drive train assembly which includes a link 11 that causes the plunger assembly 7 to reciprocate in synchronism therewith. The injection system also includes a fuel pump which supplies all of the fuel injectors by a common rail system (not shown) which requires three common fluid rails within the cylinder head, one for supplying fuel into the injection chamber, one for draining away fuel that is not injected and the third which supplies timing fluid (which may also be fuel) to vary the timing of the injection event by varying the quantity of timing fluid supplied to a variable volume timing chamber defined between the bottom of the upper plunger 8 and the top of the timing plunger 10. These aspects are not novel to the present invention and are described in greater detail in the above-noted U.S. Pat. No. 4,721,247. The '247 patent also describes the need to drain timing fluid, at the end of each injection cycle to assure a sharp cut off of the injection event and whenever the injection pressure exceeds a preset value during the injection stroke to preclude excessive wear and stress in the injector's drive train.

For purposes of draining the timing fluid, at the end of each injection cycle and whenever the injection pressure exceeds a preset value during the injection stroke, in accordance with the present invention, the timing plunger 10 has an axial passage 10a which communicates with a plurality of radial bores 10b and 10c which open into annular groove 10d and annular undercut 10e through corresponding outlet ports. The upper barrel part 3a has an annular groove 13 at its inner surface and this groove 13 connects with a valve passage 15 which connects, in turn, with the drain rail of the the engine head via a drain passage 16. However, flow to drain passage 16 (and accordingly from the timing chamber via axial passage 10a, radial bores 10b, annular groove 10d and valve passage 15) is regulated by a high pressure limiting valve 17 that is of one of the forms described in greater detail below. Similarly, flow from the timing chamber, via axial passage 10a, radial bores 10c, annular groove 10e, and low pressure space 18 to drain passage 16 is regulated by a second high pressure limiting valve 19 (which has been omitted in FIG. 1 to show the undercut 10e more clearly, but shown in the enlarged detail of FIGS. 1a-1c) that is also of one of the forms described in greater detail below. In this way, a higher preset value can be used to control the draining of timing fluid during injection than at its conclusion.

Figure 2:
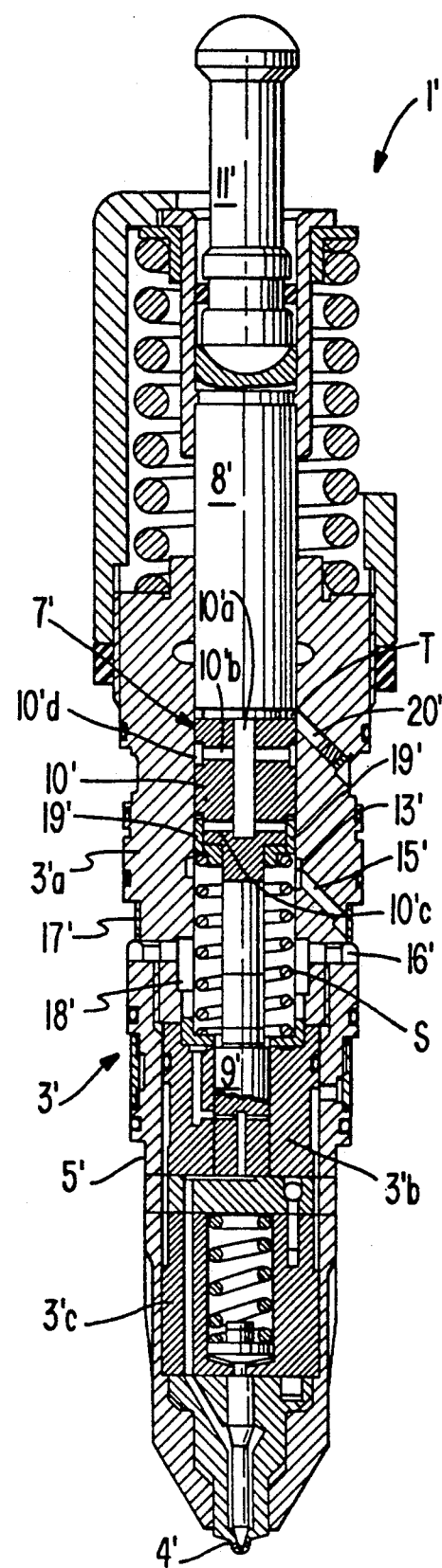
FIG. 2 is a partial cross sectional view of a closed nozzle fuel injector with pressure responsive limiting valves designed in accordance with the present invention at the start of the timing phase.

FIG. 2 shows a unit fuel injector 1' of the closed nozzle type in which parts that correspond to parts of the injector 1' of FIG. 1 have been given like reference numerals that are distinguished by a prime (') designation. In this case, draining of timing fluid occurs at the end of the injection cycle in the same manner described above relative to the injector of FIG. 1, when the pressure set by pressure limiting valve 17' is exceeded and draining of timing fluid during downward travel of the plunger assembly 7' is controlled by a second pressure limiting valve 19' which is disposed within an annular recess at the outlet end of bores 10'c. From the standpoint of this invention, and in particular, timing fluid supply, pressure regulation and drainage, the very different injectors of FIGS. 1 and 2 can be treated as being same, so that only a single description of the inventive aspects of both will be provided.

Figure 1B:
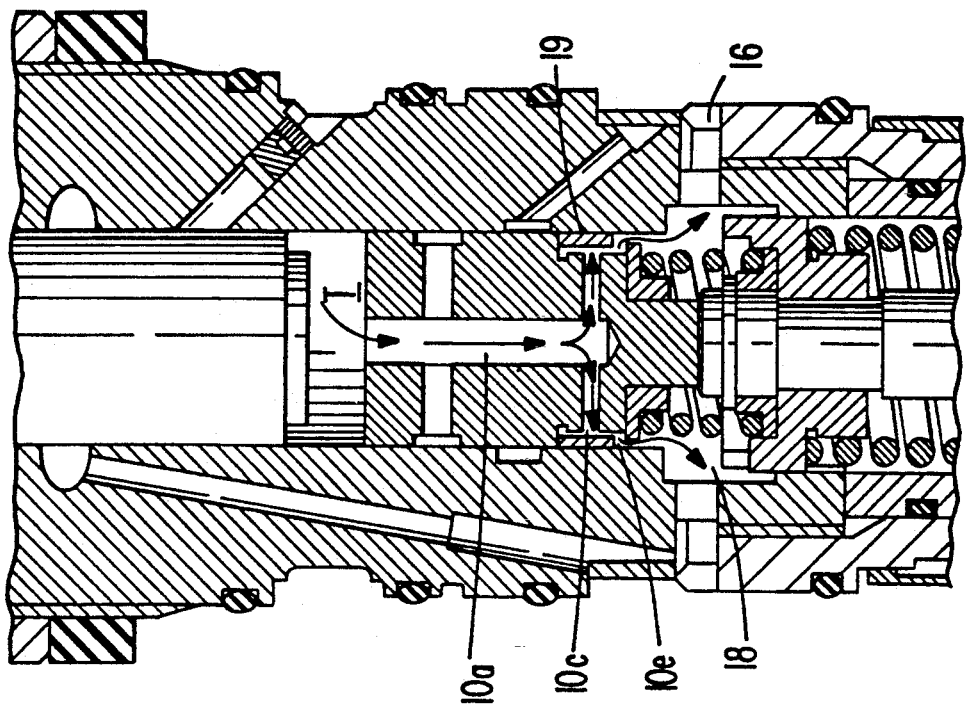
FIGS. 1a, 1b and 1c are enlarged views of the encircled detail A in FIG. 1 at commencement of the injection stroke, when an excess pressure situation occurs during the injection stroke, and during a hold-down phase at the end of the injection cycle, respectively.
Figure 1A:
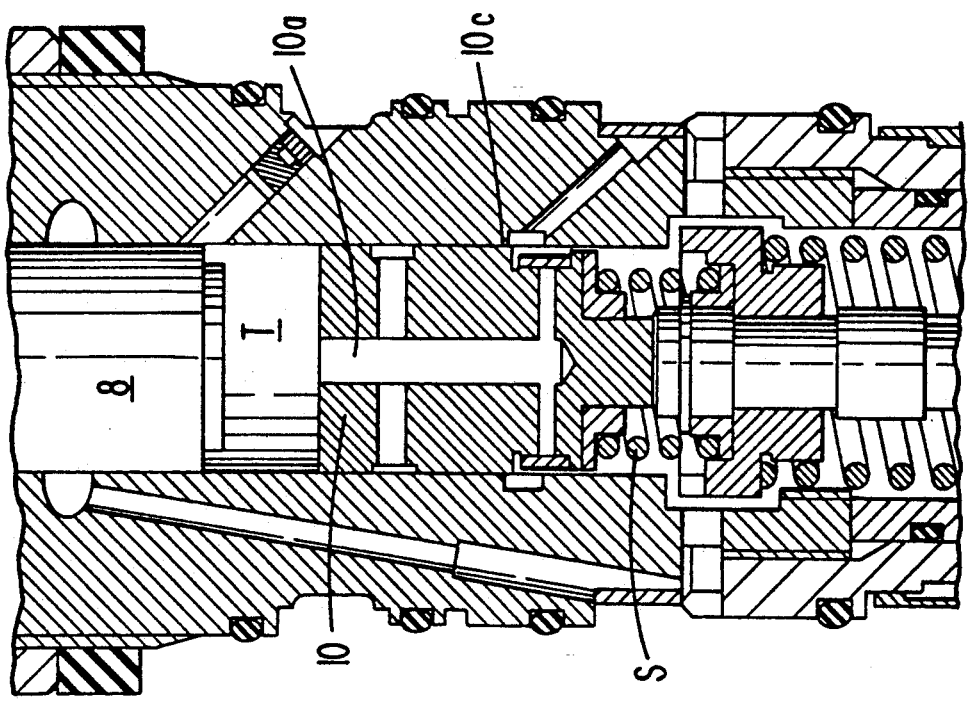
Figure 1C:
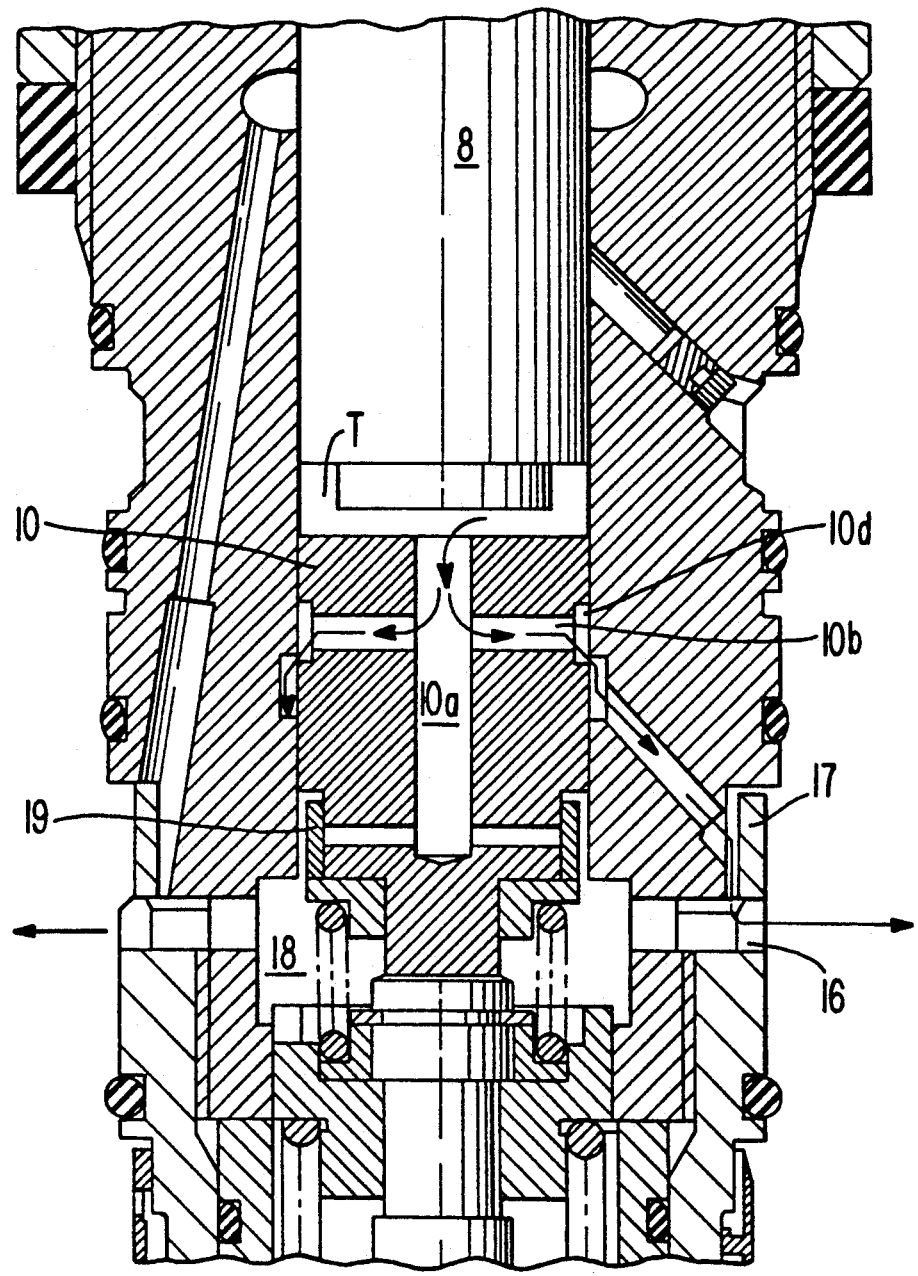

Initially, with the injector 1, 1' in the raised position shown in FIG. 2, an injection timing mode is commenced in which timing fluid is supplied via a timing fluid supply passage 20, 20' to the reduced diameter lower end of upper plunger 8, 8', and in a conventional manner, the supplied timing fluid displaces the timing plunger 10, 10' against the force of timing spring s, filling variable volume timing chamber T with an amount of timing fluid designed to appropriately adjust the timing at which injection of fuel from nozzle 4, 4' commences. With the appropriate quantity of timing fluid and fuel having been metered into the injector 1, 1', the injection stroke is performed (FIG. 1a) with upper plunger and timing plunger moving downwardly in unison due to the hydraulic link formed between them by the timing fluid in timing chamber T and with these plunger in engagement with the plunger 9. When the injection pressure is above the preset value determined by valve 19, 19' during the injection stroke, as illustrated in FIG. 1b, timing fluid causes the portion of the valve 19, 19' closing bores 10c to move radially outwardly to allow the timing fluid to pass out of the timing chamber T via passage 10a, bores 10c, annular groove 10e and low pressure space 18, 18' to drain passage 16, 16'(it is noted that even though valve 19 appears to contact the inner wall of the upper barrel 3a in this figure, a clearance is maintained at all times to prevent wear). At the end of the injection cycle, the remaining timing fluid is released during a hold-down phase (FIG. 1c), when the pressure of the timing fluid exceeds the opening pressure of valve 17, 17', in a similar manner, only using bores 10'b and groove 10'd, instead of ports 10c and groove 10e, to communicate axial passage 10a, 10'a with drain passage 16, 16' via connecting passage 15, 15'.

Figure 3:
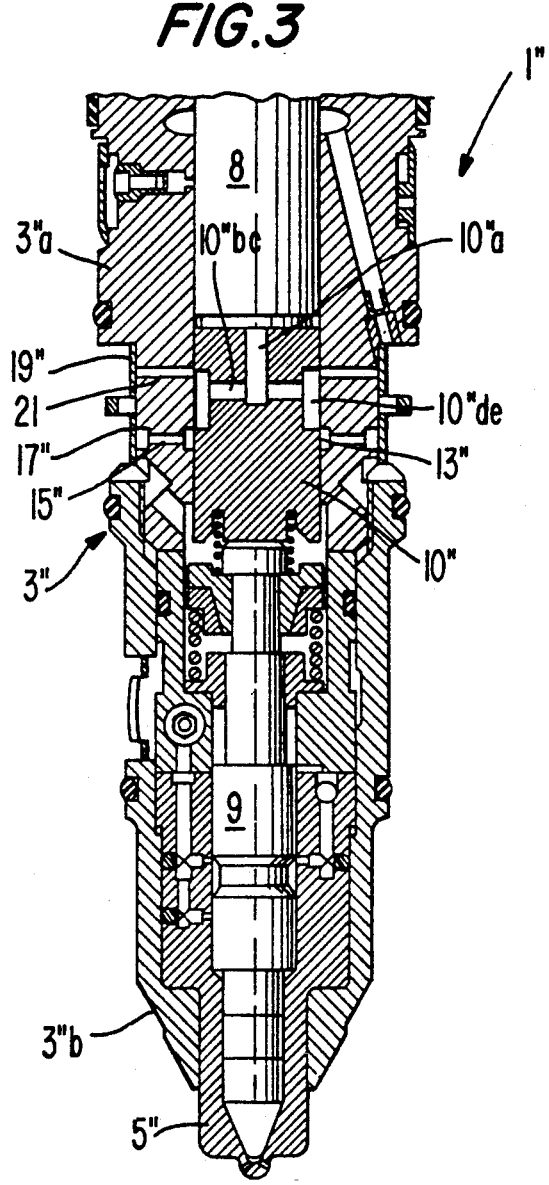
FIG. 3 is a partial cross sectional view of a lower portion of a second open nozzle fuel injector with pressure responsive l%ting valves in accordance with the present invention.

Alternatively, as reflected by the open nozzle injector 1" of FIG. 3 (in which parts that correspond to parts of the injector 1' of FIG. 2 have been given like reference numerals that are distinguished by a double prime (") designation), the second pressure limiting valve 19" can be arranged on the upper barrel part 3"a instead of on the timing plunger. In this case, timing plunger 10" has only a single set of radial ports 10"bc which communicate axial passage 10"a with a single annular groove 10"de which is longer that is equivalent to both of the grooves 10d and 10e. Additionally, a second drain passage 21 is provided in the barrel. Thus, when annular groove 10"de overlaps passage 21 during the injection stroke of the plunger assembly 7", pressure limiting valve 19" regulates the release of timing fluid from the timing chamber via drain passage 21, and at the end of injection, draining of the remaining timing fluid is regulated by the pressure limiting valve 17" via drain passage 15".

Having described one preferred environment in which a pressure limiting valve in accordance with the present invention finds particularly advantageous utility, the basic attributes of the inventive pressure limiting valve and various forms in which it can be embodied will now be described with reference to FIGS. 4-11. However, in each case, the specific identity of the component which serves as the valve body of the pressure limiting valve should be viewed as being an independent variable relative to the structural requirements of the valve itself. That is, given that a described configuration of the circumferential wall of the valve body of any embodiment can be provided on another component, and given that the described spring member can be used in the particular environment in which such a component is used, any type of component whatsoever may serve as the valve body of any embodiment in place of the specific structural element described, e.g., an injector barrel or other tubular structure can be used in place of a timing plunger as can other piston-like structures, and vice versa.

Figure 4:
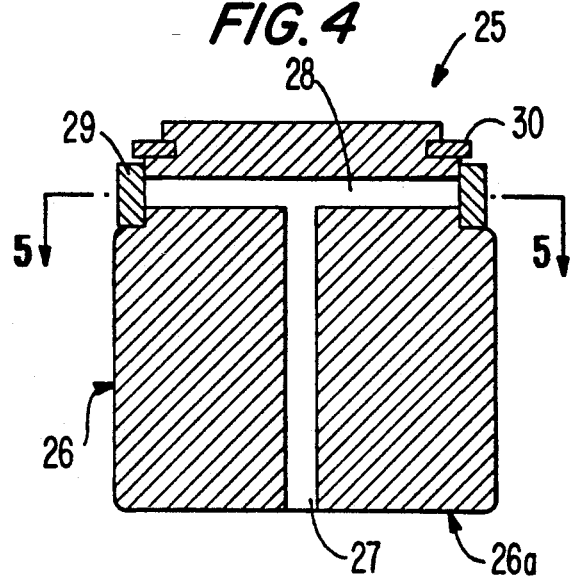
FIG. 4 is a vertical cross section of a timing plunger with a limiting valve in accordance with an embodiment of the present invention, the plunger being shown in an inverted orientation relative to that of FIGS. 1-2.
Figure 5:
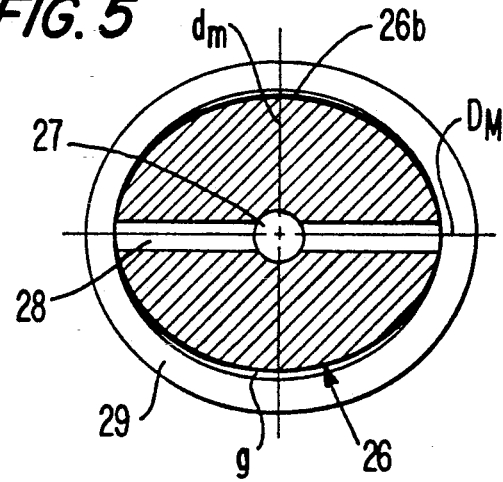
FIG. 5 is a sectional view taken along line 5—5 of FIG. 4 but with the spring member being shown unsectioned.

The pressure limiting valve 25 of FIGS. 4 and 5 has a valve body 26, which may be a timing plunger, in which an axial passage 27 runs from end face 26a into intersecting connection with, in this case, a pair of radially extending ports 28 which open out of the circumferential wall 26b that has been machined onto the valve body 26. In this regard, as can be seen from FIG. 5, circumferential wall 26b is elliptical and ports 28 open through it at the ends of its major diameter $D_M$. A valve spring member 29, formed of a ring of spring steel, is mounted over circumferential wall 26b and is prevented from falling off by a snap ring clip 30. Two point loading of the valve spring member 29 is produced at the surface areas of wall 26b surrounding the outlets of ports 28 due to the difference in configuration of the valve spring member 29 relative to circumferential wall 26b. In particular, the valve spring member 29 has a circular shape of a diameter that is greater than the minor diameter $d_m$ of circumferential wall 26b and smaller than its major diameter $D_M$ so that the spring member is bent into an out-of-round shape at the ends of major diameter $D_M$ but with a gap g being maintained between the spring member 29 and the circumferential wall 26b being maintained at both sides of the port areas. The gap allows the spring member 29 to undergo further bending during operation and can be used to control the maximum distortion of the ring-shape of valve spring member 29 for purposes of preventing contact with the inner wall of the upper barrel 3a (or engine head in those cases where the injector barrel serves as the valve body) and for limiting stress in the spring member. The difference between the major diameter $D_M$ and the initial, i.e., undistorted interior diameter of the circular spring member 29 is selected to control the preload on the valve spring member 29.

The pressure to be limited by valve 25 is introduced, e.g., from a timing chamber, through axial passage 27 and ports 28 to the portions of spring member 29 which cover and seal the outlets of ports 28. As long as the pressure force on the exposed area of the valve spring member 29 is smaller than the ring deformation force, the ports 28 remain closed. When the pressure force exceeds the preset preload, the ring is deformed further into a more elongated shape and the pressurized fluid starts escaping through the resultant clearance between the inner surface of the valve spring member 29 and the surface of circumferential wall 26b and then into a free space below the plunger or into a drain passage. As the spring member becomes more elongated, gap g closes, thereby setting a limit to the amount of elongation, i.e., valve lift. When the fluid pressure drops back below the preload, spring member 29 reseals the ports; however, since the contact area around the port outlets is relatively large, a fuel film is trapped between the valve spring member 29 and the contact areas of circumferential wall 26b and produces a hydraulic damping, along with that produced by fuel in gap g, to minimize valve chatter.

Importantly, because the valve spring member 29 is loaded in bending instead of being stretched in a normal press or shrink fit, a lower effective spring rate can be achieved. The obtaining of a lower spring rate, in turn, makes the valve spring member less affected by manufacturing tolerances and permits a finer control of opening pressure. During operation, the spring member 29 is free to turn and this has the effect of causing any wear or erosion to be distributed over the entire circumference of spring member 29. Furthermore, as the spring member turns, the bending stresses are gradually reversed, preventing any permanent distortion or load relaxation. However, in high stress situations where fatigue poses a greater problem, the spring member 29 can be fixed to prevent rotation thereof by the provision of a pin on the inside of the spring member that is received in a recess in the valve body 26, similar to the situation shown in FIGS. 13 and 14. In such a case, the pin should be located at a point of low stress and should not act to apply an outward force on the spring member (in contrast to the situation described below relative to the pin of FIGS. 13 and 14.

In FIGS. 6 and 7, a pressure limiting valve 35 is shown of the type which would be usable, for example, for timing plunger 10, 10' of FIGS. 1, 2. Thus, the valve body 36 has a first axial passage 37 which connects to a first pair of radial bores 38 (FIGS. 8a and 8b), which have ports which open into an annular recess 39. The valve 35 does not control the flow of fluid through passage 37 and bores 38, such being regulated by an external, pressure limiting valve which is the counterpart of valve 17, 17' of FIGS. 1, 2. However, instead of using a common passage to communicate with both sets of radial bores 10c, 10'c and 10d, 10'd, in this embodiment, a separate pair of axial passages 42 are provided for communicating the pressurized fluid with the second set of radial bores 40. The second set of radial bores have ports which open at a circumferential wall that, instead of being machined into an elliptical shape, achieves an equivalent effect by being formed of convex segments 41a and 41c that have been machined to a curvature that approximate circular cylindrical segments and flats 41b that have been cut into the perimeter of valve body 36 so as to produce a major diameter $D_M$ and a minor diameter $d_m$. As in the preceding embodiment, the ports of bores 40 open at the ends of the major diameter $D_M$ and are closed by an initially circular valve spring member that has been elongated over the convex segments 41a to sealingly close the ports of bores 40 under a predetermined preload, while leaving a small clearance between the inner surface of the spring member 43 and the segments 41a. This clearance (which is not apparent in FIG. 9a, but is similar to that shown in FIGS. 11 or 12) functions in the same way and for the same purposes as the gap g in the FIG. 4 and 5 embodiment. The circular segment surface areas 41a of the circumferential wall have a eater radius of curvature at the ends of the minor diameter $d_m$ than at the ends of the major diameter $D_M$.

This configuration of flats and convex segments and the four resultant gaps g' between the valve spring member 43 and the flats 41b provide a greater total clearance than the two gaps g of FIG. 5 while enabling a smaller radial clearance to be achieved at surface 41a. This affords a greater area for drainage between the spring member 43 and the valve circumferential wall 36 of the valve body 35. At the same time, the spring member 43 is still able to respond to a pressure above that of its preload by expanding away from the ports 40 by bending of the valve spring member 43 toward the segments 41a. Furthermore, this embodiment obtains greater control from the standpoint of a precision factor $P_f$ which is measured as the pressure at which the valve opens, $p_o$, divided by the pressure at which maximum flow occurs $p_m$, i.e., $P_f = P_o/P_m$, (the closer the precision factor is to 1, the more precise is the control) since it is possible to achieve a more defined surface area upon which the fluid pressure acts.

While the degree of preload on the valve spring member 43 of this embodiment can be set in the same manner noted relative to the embodiment of FIGS. 4 and 5, by modifying the valve body of FIGS. 8a and 9a in the manner shown in FIGS. 8b and 9b, not only can the degree of preload be more precisely set, but ring stresses in the valve spring member can be reduced and a capability to change the preload obtained. In particular, a crossbore is provided through the valve body 36 along minor diameter $d_m$. Am adjustment pin 47 is disposed in each end of the crossbore, and these pins 47 are urged radially outwardly against the valve spring member 43 by an adjustment spring 49 that is situated in the crossbore between the inner ends of the adjustment pins 47. The pins 47 have partially spherical heads.

Figure 10:
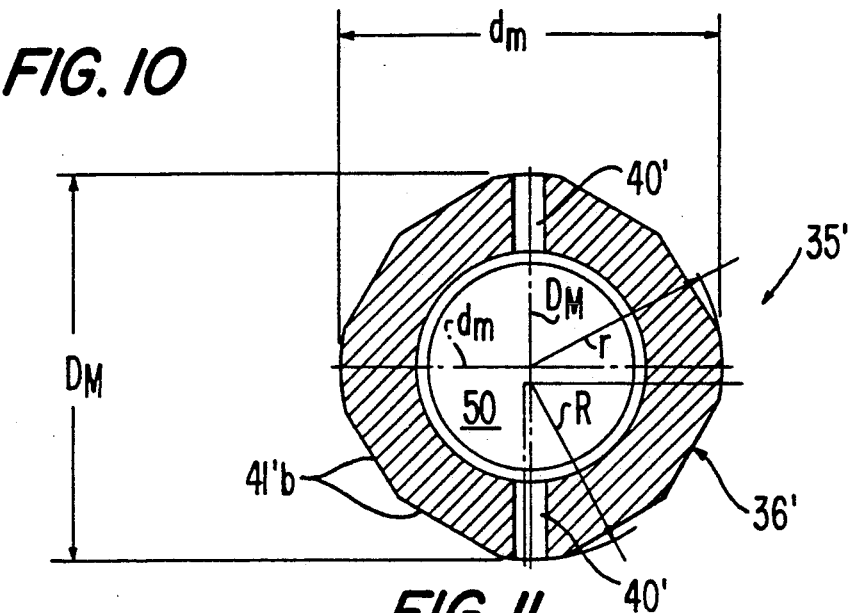
FIG. 10 is a cross-sectional view of an injector barrel configuration for forming a valve body of a pressure limiting valve according to another embodiment of the invention.

FIG. 10 illustrates implementation of a modified form of the limiting valve concept of FIGS. 6-9 on the exterior of a cylindrical valve body, such as where the valve body 36' is formed by the barrel of a fuel injector, as is the case for the pressure limiting valves 17, 17', 17" and 19" in FIGS. 1-3. Here again, the equivalent of an elliptical configuration is produced by machining convex segment, i.e., of an elliptical, circular or complex curvature, surface areas 41'a and 41'c and cutting flats 41'b on the circumferential wall of the valve body 36'; although, achieving a more nearly elliptical shape is not a goal being sought and the benefit to using more sides is that it decreases the amount of material that is removed from the valve body and the extent that the valve body is weakened as a result. The radius of curvature R of the convex segment surface areas 41'a located at the ends of the major diameter $D_M$ is smaller than the half length of the major diameter, while the radius of curvature r of the convex segment surface areas 41'a located at the ends of the minor diameter $d_m$ is larger than the half length of the major diameter $D_M$. As is the case for flats 41b, the flats 41'b improve drainage and can be left unfinished. A valve spring member of the same character already described is mounted over the valve body 36' to produce pressure regulation of fluid passing from central bore 50 (or a timing or other plunger therein) out of radial bores 40', also, in the same manner indicated above.

Figure 11:
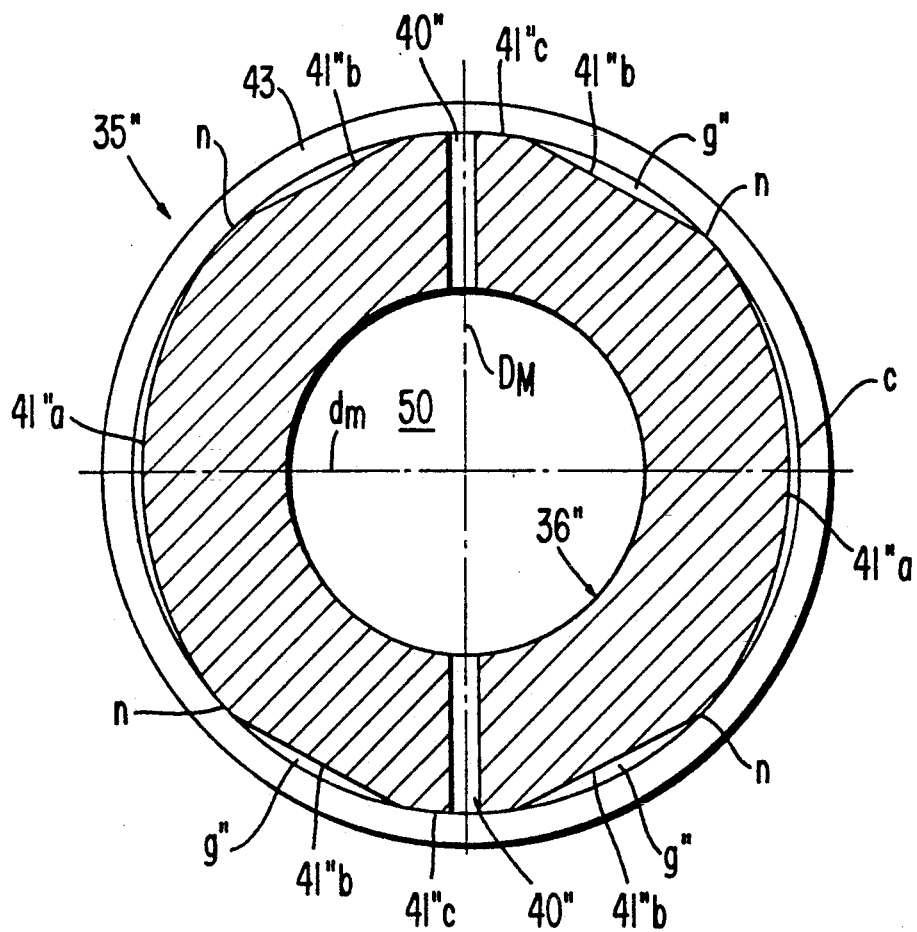
FIGS. 11 and 12 are cross-sectional views of pressure limiting valves in which modified forms of injector barrel configurations for serve as the valve body of the pressure limiting valve.

A more preferred, modified form of the preceding embodiment is the valve 35" shown in FIG. 11, where like reference numerals have again been used to identify like components with a double-prime (") being used to distinguish this embodiment. In this case, the convex segment surface areas 41"a are elliptical segments that span 90° of arc centered on the minor diameter $d_m$ and a single small flat 41"b is cut into the valve body 36' at each side thereof creating gaps g" that merge into a clearance space c between the inside of spring member 43 and surface areas 41"a. Ports 40", once again, are formed at the opposite ends of the major diameter $D_M$, and the surface areas into which they open are machined to a circular or complex curvature against which the spring member 43 can engage to close the ports 40". When the valve opens, the spring member 43 moves away from the ports 40" to the extent controlled by the size of gap c, i.e., until the spring seats against surface areas 41a", and the gaps g" provide a drainage path. An important characteristic of valve 35" is the fact that nodes n, at which the distance between the valve spring 43 and the valve body 36" always remains constant, are formed at the junction of the surface areas 41"a and the flats 41"b. These nodes have the effect of keeping the coaxial arrangement of the spring member 43 with respect to the valve body 36", i.e., it prevents shifting of the valve spring member 43 along either diameter $d_m$ or $D_M$ when the spring opens or closes (when it is fully off valve body 36), thereby preventing damaging stresses from being produced.

Figure 12:
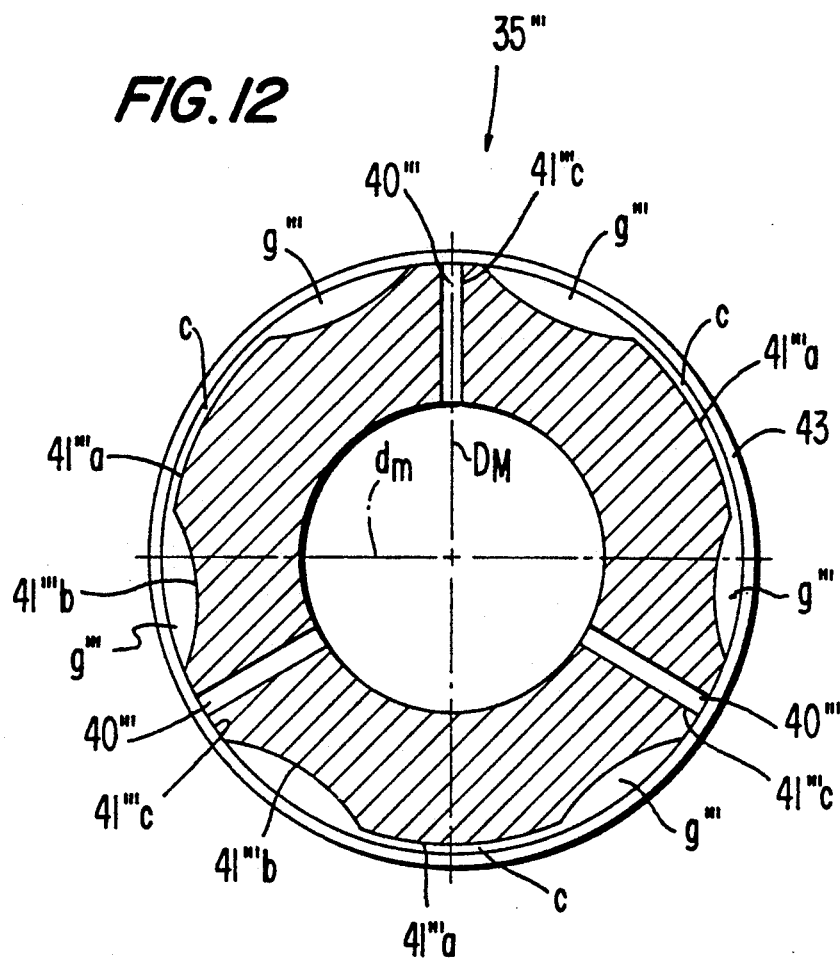

While all of the preceding embodiments have been provided with a pair of ports on surfaces at the diametrally opposed ends of the major diameter $D_M$, such is not a prerequisite. Likewise, in the preceding valves 35, 35', 35", planar flats 41$b$, 41'$b$, 41"$b$ have been cut into the valve body and such is not necessary either. In FIG. 12, a modified form of the preceding embodiment is shown in which three ports 40''' are disposed symmetrically 120° apart and the gap-forming "flats" have been arcuately cut. In this case, a surface area at which a bore 40''' has its outlet is disposed opposite a respective surface area 41'''$a$; nonetheless, as shown in FIG. 12, the surface areas define a respective minor diameter $d_m$ of the valve body and with the surface areas carry the outlet ports of bores 40''' defining the major diameter $D_M$, i.e., these surface areas are tangent to an inscribing circle of the respective diameter.

Such a 3-port arrangement has the advantage that no special steps need be taken to insure that the valve spring member 43 remains coaxial relative to the valve body 36... since the three ports have a self-centering effect. On the other hand, for a valve body of a given diameter, a three port arrangement as shown in FIG. 12 necessitates that the valve spring 43 be thinner than it would for the opposed port arrangements of the prior embodiments if the same opening pressure is to be achieved and if the same spring member is used, a higher pressure will be required to cause the valve 35''' to open.

As noted in the background portion of this specification, split ring pressure limiting spring valves of the type used in the prior art are only suitable for situations in which the pressure of the fluid being regulated is not that great and/or a high degree of precision is not required, such that the prior spring valves would not be able to meet the demands for precision control that are necessary in high pressure fuel injectors for internal combustion engines that are being designed to have increased fuel economy and improved pollution control characteristics and which necessitate fast response times and minimum space requirements. Furthermore, it was pointed out that, in comparison to a continuous annular valve spring member, such split ring valve spring members are more difficult to make and install.

Nonetheless, there are situations in which it is simply not feasible to use a continuous annular spring valve member due to the size and/or configuration of the components into which the valve is to be incorporated. For example, in fuel injectors of the above-described types, it is sometimes not possible to configure the barrel of the injector to have a pressure limiting valve spring member on its exterior, and at the same time, with especially small fuel injectors and/or relatively low fluid control pressures, it may not be possible to obtain a high enough degree of precision if a closed ring type valve is incorporated into the timing plunger as the shown, for example, in the embodiment of FIGS. 4 and 5.

That is, a precision factor, as defined above, of about 0.8 can be obtained when a spring member as disclosed herein is mounted on the outside of the barrel of a fuel injector which serves as its valve body. On the other hand, due to the high stiffness of a continuous annular ring, when very small diameters of one-half inch or less are involved, the precision factor associated with the use of a pressure responsive spring valve with a spring member of a closed annular shape drops to around 0.6 to 0.7, a degree of precision that is unacceptable for a fuel injector which requires fast response times to obtain increased fuel economy and improved pollution control characteristics. For such circumstances, the split ring embodiments of FIGS. 13 and 14 can be more advantageous.

Figure 13:
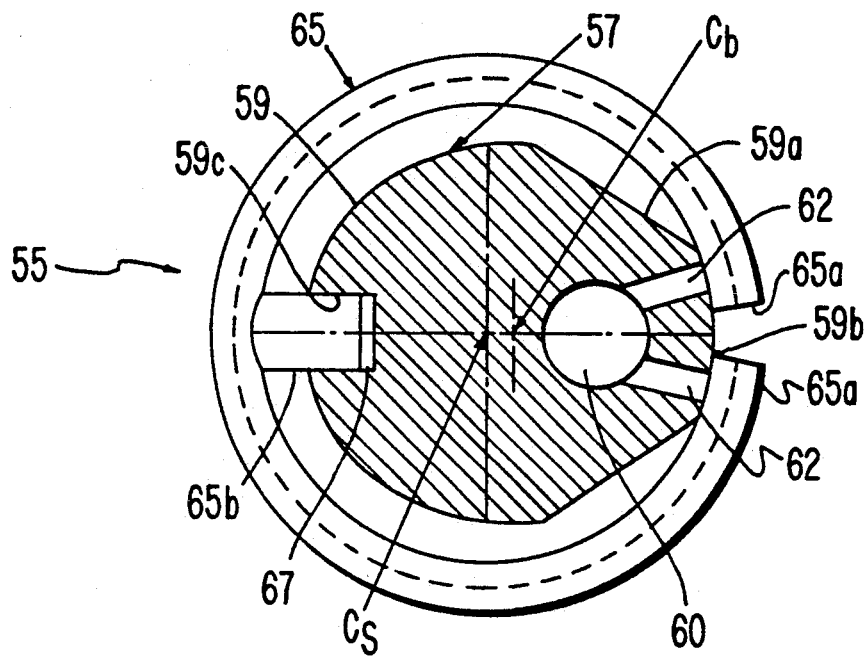
FIG. 13 is a partial sectional view of another embodiment of a timing plunger with pressure limiting valve in accordance with the invention.
Figure 14:
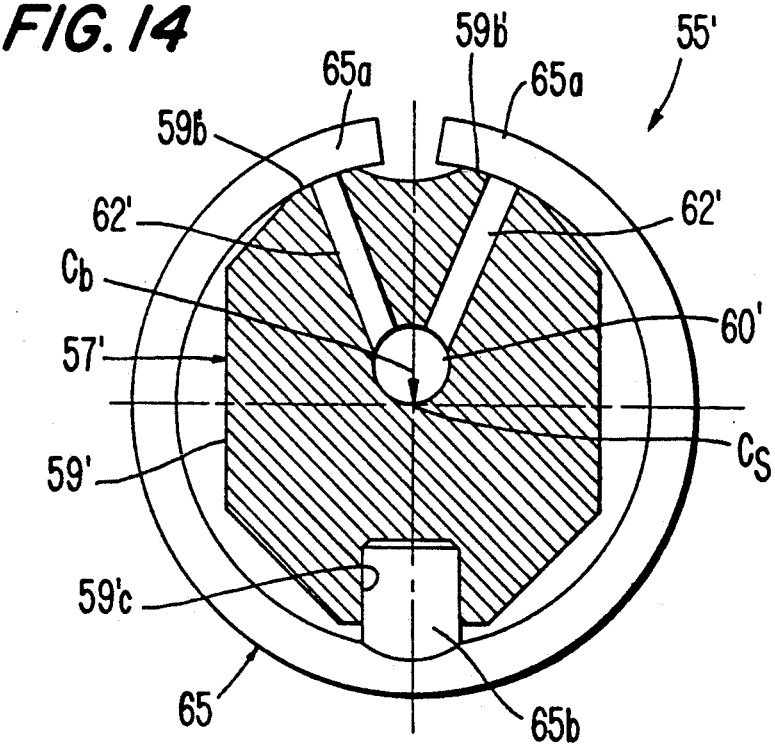
FIG. 14 is a modified form of the embodiment of FIG. 13.

In the pressure limiting valve of FIG. 13, the valve body 57 is a cylindrical pin or plunger, the circumferential wall 59 of which has had a flat 59$a$ symmetrically cut from adjoining quadrants on one half of the cross section so as to leave a convex segment surface area 59$b$ therebetween which must be machined to a single complex curvature (or like circular segment surface areas 59'$b$, as is the case shown in FIG. 14), so that the end portions 65$a$ of valve spring member 65 will be able to match themselves to surface area 59$b$ or surface areas 59'$b$ to seal the ports of passages 62, 62'. On the other hand, as reflected by apparant differences between the valve bodies of valves 55, 55' of FIGS. 13 and 14, apart from the surface areas 59$b$, 59'$b$, substantial freedom exists in the manner in which the remainder of the cross-section of valve body 57, 57' is configured.

An axial passage 60, 60' extends from one end face of the valve body 57, 57' axially through it into communication with the pair of radial bores 62, 62' that have outlet ports in surface area 59$b$, or surface areas 59'$b$. The valve spring member 65 is formed of a thick ring that has been cut on one side producing facing ring end portions 65$a$. Spring member 65 has a larger diameter than valve body 57, 57' and has a mounting projection 65$b$ that is received in a mounting recess 59$c$, 59'$c$ that is disposed diametrally opposite and centrally with respect to bores 62, 62'. The length of the mounting projection 65$b$ is such as to position the center $C_s$ of spring member 65 sufficiently rearwardly of the center $C_b$ of the valve body 57 so as to draw the ends 65$a$ of the spring member against surface area 59$b$ or surface areas 59'$b$, thereby opening the spring member and firmly engaging its end portions on the surface area(s) 59$b$ (59"$b$) for sealingly closing the outlet ports of the bores 62, 62'.

Because only the end portions of the valve spring member 65 engage on the valve body 57, 57', its preloading is concentrated in the area of the outlet ports of bores 62, 62', thus increasing the pressure which can be regulated. Furthermore, this concentrated closing pre-load can be increased and precisely adjusted by the provision of a plurality of shims, the number/thickness of which that are received in mounting recess 59$c$, 59'$c$, between the bottom of the mounting recess and the facing end of mounting projection 65$b$, 65'$b$, can be varied. Alternatively, blocks of varying size may be used instead of shims. By varying the number of shims, or the size of blocks, used, the spring center $C_s$ can be shifted farther from valve body center $C_b$, with the result that the preload on the ends of the split valve spring member 65 is increased. By way of example, with a spring member 65 having a stiffness of 2700 lbs./in., a maximum stress of 70,000 psi can be achieved and the pressure of the fluid being controlled can be regulated with a precision factor of 0.8.

As can be appreciated from the foregoing, neither the specific type of injector nor the number of pressure limiting valves or their placement is critical to the present invention. What is important is that a valve spring member be mounted over a valve body member in a way that permits the preloading of the spring member to be concentrated in the area of the one or more outlet ports to be closed thereby, such that high pressures can be regulated with precision. Also, as a general rule, a continuous ring is preferable to a split ring, and mounting of the valve spring member on a larger outer surface of an enclosing cylindrical body (such as an injector barrel) is preferred over mounting of the valve spring member on a smaller inner member (such as on a timing plunger).

INDUSTRIAL APPLICABILITY

The present invention will find applicability in a wide range of applications where high pressures need to be regulated with precision. Of particular significance, however, will be in the automotive arts, particularly fuel injection systems as described above. That is, in systems where a fluid, the pressure of which is being regulated, travels through passages and bores in cylindrical and tubular bodies that can serve as a valve body over which a band-like spring member can be suitably mounted.

We claim:

1. A high pressure limiting valve with a fast response comprising:
   A) a valve body having a circumferential wall of a circumferential configuration with at least one surface area in which at least one outlet port is formed, said at least one outlet port communicating with a flow passage formed in said valve body; and
   B) a band-shaped resilient resilient metal valve spring member, said spring member being mounted over the circumferential wall of the valve body and having a different circumferential configuration from that of the circumferential wall, the configuration of the band-shaped spring member, in a first, closed condition thereof, matching said at least one surface area of the circumferential wall in an area in which said at least one outlet port is formed and being spaced from other portions of said circumferential wall circumferentially on both sides of said at least one surface area to facilitate resilient bending of said spring member and drainage of fluid from between the spring member and the circumferential wall;
   wherein said spring member seals said at least one port in said closed condition thereof, and wherein said spring member is resiliently bendable into a second, open condition, under pressure exerted by fluid in said at least one port, in which said band-shaped spring member is displaced from the at least one surface portion of said circumferential wall for permitting discharge of fluid from said at least one outlet port.

2. A high pressure limiting valve according to claim 1, wherein the circumferential configuration of the band-shaped spring member comprises a circular arc segment in an undeformed state, and wherein the circumferential configuration of the circumferential wall of the valve body is noncircular.

3. A high pressure limiting valve according to claim 2, wherein the at least one surface area of the circumferential wall defines a convex arc segment.

4. A high pressure limiting valve according to claim 2, wherein said valve spring member is a split circular ring and the configuration of the circumferential wall of the valve body is of a cylindrical shape having a maximum diametral width that is smaller than the diameter of the circular ring; and wherein mounting means is provided for mounting the split circular ring with its center shifted radially relative to the center of the maximum diametral width of the circumferential wall of the valve body to an extent which produces an opening of the split ring with ends of the split ring firmly engaged on said at least one surface area so as to seal the at least one port formed therein.

5. A high pressure limiting valve according to claim 4, wherein said mounting means comprises a radially inwardly directed projection extending from the split ring at a point opposite the split therein and being received in a mounting bore formed in the valve body.

6. A high pressure limiting valve according to claim 5, wherein adjusting means are provided for adjusting the pressure applied by the engagement of the ends of the split ring on said at least one surface area of the circumferential wall of the valve body.

7. A high pressure limiting valve according to claim 6, wherein said adjusting means comprises a plurality of shims, a variable number of which are receivable within said mounting bore for varying the extent to which the projection of the split circular ring is received in the mounting bore.

8. A high pressure limiting valve according to claim 1, wherein said band-shaped spring member has a circular shape in an unstressed state; wherein the circumferential configuration of the circumferential wall of the valve body is a square with corners in the form of convex arc segments; wherein a diagonal between a first pair of said convex arc segments at one pair of opposite corners of said square forms a major diameter of the valve body and a diagonal between a second pair of said convex arc segments at the other pair of opposite corners of said square forming a minor diameter of the valve body; wherein the radius of curvature of said first pair of arc segments is smaller than the radius of curvature of said second pair of arc segments; and wherein said at least one outlet port comprises at least one outlet port provided in each of said first pair of convex arc segments at opposite corners of the circumferential wall of said valve body.

9. A high pressure limiting valve according to claim 8, wherein a throughhole extends between said second pair of opposite corners of the circumferential wall of the valve body; wherein a pin member is slidably received in said throughhole at each of said second pair of opposite corners; and wherein spring means is provided for urging said pin members outwardly into engagement with said valve spring member.

10. A high pressure limiting valve according to claim 1, wherein the circumferential wall of the valve body has an elliptical configuration and the initial circumferential configuration of the valve spring member is circular, the diameter of the circular configuration of the valve spring member being greater than that at a minor diameter of said elliptical configuration and less than that at a major diameter of said elliptical configuration; and wherein said at least one outlet port comprises a port at each of opposite ends of the major diameter of the elliptical configuration of the circumferential wall of the valve body.

11. A high pressure limiting valve according to claim 1, wherein said band-shaped spring member has a circular shape in an unstressed state; wherein the circumferential configuration of the circumferential wall of the valve body is a cylinder having an alternating series of convex arc segments and flats; wherein a first half of said convex arc segments of said cylinder are on an end of a major diameter of the valve body and a second half of said convex arc segments of said cylinder are on an end of a minor diameter of the valve body; wherein the radius of curvature of said first half of the arc segments is smaller than the radius of curvature of said second half of the arc segment; and wherein said at least one outlet port comprises at least one outlet port provided in each of said first half of the convex arc segments.

12. A high pressure limiting valve according to claim 11, wherein said first half of the convex arc segments comprise a pair of arc segments at opposite ends of the major diameter of the cylinder and said second half of the arc segments comprise a second pair of arc segments at opposite ends of the minor diameter.

13. A high pressure limiting valve according to claim 12, wherein said second pair of arc segments have an elliptical curvature and span ninety degrees of arc.

14. A high pressure limiting valve according to claim 13,. wherein nodal junctions are formed between the flats and the said second pair of arc segments at which a clearance between the spring member and the valve body remains constant in all positions of the spring from its closed condition to its open condition.

15. A high pressure limiting valve according to claim 12, wherein nodal junctions are formed between the flats and said second pair of arc segments at which a clearance between the spring member and the valve body remains constant in all positions of the spring from its closed condition to its open condition.

16. A high pressure limiting valve according to claim 11, wherein a radial clearance is provided between the spring member and the valve body that extends between successive arc segments of said first half of the convex arc segments in the closed condition of the spring member.

17. A high pressure limiting valve according to claim 16, wherein the second half of the arc segments serve as means for setting the open condition of the spring member and the amount to which said spring member is displaced in moving from its closed condition to its open condition corresponding to the radial extent of the clearance between the spring member and the second half of the arc segments in its open condition.

18. A high pressure limiting valve according to claim 1, wherein said band-shaped spring member has a circular shape in an unstressed state; wherein the circumferential configuration of the circumferential wall of the valve body is a cylinder having an alternating series of convex arc segments and non-convex segments; wherein a first half of the convex arc segments comprise a symmetric arrangement of three arc segments, and a second half of the arc segments comprise a second three arc segments, wherein the radial extent of said first half of the arc segments is greater than the radial extent of said second half of the arc segments, and the radius of curvature of said first half of the arc segments is smaller than the radius of curvature of said second half of the arc segments; and wherein said at least one outlet port comprises at least one outlet port provided in each of said first half of the convex arc segments.

19. A high pressure limiting valve according to claim 18, wherein said second three arc segments have an elliptical curvature and span approximately 40–45 degrees of arc.

20. A high pressure limiting valve according to claim 18, wherein the non-convex segments are concavely curved.

21. A high pressure fuel injector for injecting fuel into a combustion chamber of an internal combustion engine comprising:
A) an injector body containing a central bore and an injection orifice at a lower end of the body;
B) metering means for metering a variable quantity of fuel for injection through the injection orifice on a periodic basis, said metering means including a lower plunger mounted for reciprocal movement within said central bore;
C) hydraulic timing means for varying the timing of each periodic injection of fuel dependent upon an amount of hydraulic timing fluid supplied to a timing chamber disposed between an upper plunger that is mounted for reciprocal movement in said central bore and said lower plunger; and
D) a pressure actuated valve means for opening and closing passage means from said timing chamber for draining timing fluid from said timing chamber whenever the pressure of the timing fluid in said timing chamber exceeds a predetermined value;
  wherein said pressure actuated valve means includes a valve body having a circumferential wall with at least one surface area in which at least one outlet port is formed, said at least one outlet port communicating with a flow passage formed through said valve body, and a band-shaped resilient valve spring member mounted over the circumferential wall of the valve body; wherein said spring member seals said at least one port in a closed condition thereof; wherein said spring member is resiliently movable into a second, open condition, in which said band-shaped spring member is displaced from said circumferential wall for permitting discharge of fluid from said at least one port, under pressure exerted by fluid in said at least one port; wherein said hydraulic timing means comprises an intermediate plunger mounted for reciprocal movement in said central bore between said upper and lower plungers, said timing chamber being defined between said upper plunger and said intermediate plunger; and wherein a portion of said passage means extends from said timing chamber to a circumferential wall of the intermediate plunger for communicating with a portion of said passage means formed in a circumferential wall of the injector body.

22. A high pressure fuel injector according to claim 21, wherein said valve body is formed said intermediate plunger that is mounted for reciprocal movement in said central bore between said upper and lower plungers.

23. A high pressure fuel injector according to claim 21, wherein said valve body is formed by said injector body.

24. A high pressure fuel injector according to claim 21, wherein said pressure actuated valve means is operative to drain fluid from said timing chamber both when the pressure of the timing fluid therein exceeds a first predetermined pressure during an injection stroke movement of said lower plunger toward said injection orifice and at an end of said injection stroke movement.

25. A high pressure fuel injector according to claim 21, wherein said pressure actuated valve means comprises first and second band-shaped resilient valve spring members; wherein said first valve spring member is operative to regulate the pressure at which timing fluid is drained from said timing chamber when the pressure of the timing fluid therein exceeds a first predetermined pressure during an injection stroke movement of said lower plunger toward said injection orifice and wherein said second valve spring member is operative to regulate the pressure at which timing fluid is drained from said timing chamber at the end of said injection stroke movement.

26. A high pressure fuel injection according to claim 25, wherein said intermediated plunger that is mounted for reciprocal movement in said central bore between said upper and lower plungers serves as the valve body upon which said first valve spring is mounted.

27. A high pressure fuel injector according to claim 26, wherein said injector body serves as the valve body upon which said second valve spring is mounted.

28. A high pressure fuel injector according to claim 25, wherein said injector body serves as the valve body upon which said first and second valve spring members are mounted.

29. A high pressure fuel injector for injecting fuel into a combustion chamber of an internal combustion engine comprising:
A) an injector body containing a central bore and an injection orifice at a lower end of the body;
B) metering means for metering a variable quantity of fuel for injection through the injection orifice on a periodic basis, said metering means including a lower plunger mounted for reciprocal movement within said central bore;
C) hydraulic timing means for varying the timing of each periodic injection of fuel dependent upon an amount of hydraulic timing fluid supplied to a timing chamber disposed between an upper plunger that is mounted for reciprocal movement in said central bore and said lower plunger; and
D) a pressure actuated valve means for opening and closing passage means from said timing chamber for draining timing fluid from said timing chamber whenever the pressure of the timing fluid in said timing chamber exceeds a predetermined value; wherein said pressure actuated valve means includes a valve body having a circumferential wall with at least one surface area in which at least one outlet port is formed, said at least one outlet port communicating 30. A high pressure fuel injector according to claim 29, wherein said band-shaped spring member has a circular shape in an initial unstressed condition and the circumferential configuration of the circumferential wall of the valve body is a square with corners in the form of circular arc segments; wherein a diagonal between a first pair of said circular arc segments at one pair of opposite corners of said square forms a major diameter of the valve body and a diagonal between a second pair of said circular arc segments at the other pair of opposite corners of said square forming a minor diameter of the valve body; wherein the radius of curvature of said first pair of arc segments is smaller than the radius of curvature of said second pair of arc segments; and wherein said at least one outlet port comprises at least one outlet port provided in each of said first pair of circular arc segments at opposite corners of the circumferential wall of said valve body.

31. A high pressure fuel injector according to claim 30, wherein a throughhole extends between said second pair of opposite corners of the circumferential wall of the valve body; wherein a pin member is slidably received in said throughhole at each of said second pair of opposite corners; and wherein spring means is provided for urging said pin members outwardly into engagement with said valve spring member.

32. A high pressure fuel injector according to claim 29, wherein the circumferential wall of the valve body has an elliptical configuration and the initial circumferential configuration of the spring member is circular, the diameter of the circular configuration of the spring member being greater than that at a minor diameter of said elliptical configuration and less than that at a major diameter of said elliptical configuration; and wherein said at least one outlet port comprises a port at each of opposite ends of the major diameter of the elliptical configuration of the circumferential wall of the valve body.

33. A high pressure fuel injector according to claim 29, wherein said valve spring member is a split circular ring and the configuration of the circumferential wall of the valve body is of a cylindrical shape having a maximum diametral width that is smaller than the diameter of the circular ring; and wherein mounting means is provided for mounting the split circular ring with its center shifted radially relative to the center of the maximum diametral width of the circumferential wall of the valve body to an extent which produces an opening of the split ring with ends of the split ring firmly engaged on said at least one surface area so as to seal the at least one port formed therein.

34. A high pressure fuel injector according to claim 33, wherein said mounting means comprises a radially inwardly directed projection extending from the split circular ring at a point opposite the split therein and being received in a mounting bore formed in the valve body.

35. A high pressure fuel injector according to claim 34, wherein adjusting means are provided for adjusting the pressure applied by the engagement of the ends of the split circular ring on said at least one surface area of the circumferential wall of the valve body.

36. A high pressure fuel injector according to claim 35, wherein said adjusting means comprises a plurality of shims, a variable number of which are receivable within said mounting bore for varying the extent to which the projection of the split circular ring is received in the mounting bore.

37. A high pressure fuel injector according to claim 29, wherein said band-shaped spring member has a circular shape in an unstressed state; wherein the circumferential configuration of the circumferential wall of the valve body is a cylinder having an alternating series of convex arc segments and flats; wherein a first half of said convex arc segments of said cylinder are on an end of a major diameter of the valve body and a second half of said convex arc segments of said cylinder are on an end of a minor diameter of the valve body; wherein the radius of curvature of said first half of the arc segments is smaller than the radius of curvature of said second half of the arc segments; and wherein said at least one outlet port comprises at least one outlet port provided in each of said first half of the convex arc segments.

38. A high pressure fuel injector for injecting fuel into a combustion chamber of an internal combustion engine comprising:
A) an injector body containing a central bore, an injection orifice at a lower end of the body, and at least one flow passage leading from said central bore through a wall of said body;

B) a plunger mounted for reciprocal movement within said central bore and having passage means therethrough, said passage means being alignable with said at least one flow passage in a manner communicating a portion of said central bore at a first side of said plunger therewith; and C) a pressure actuated valve means for commencing and blocking a flow of fluid through said passage means and said at least one flow passage in dependence upon the pressure of said fluid relative to a predetermined value;

wherein said pressure actuated valve means includes a valve body having a circumferential wall with at least one surface area in which at least one outlet port is formed, said at least one outlet port communicating with a flow passage formed through said valve body, and a band-shaped resilient valve spring member mounted over the circumferential wall of the valve body; wherein said spring member seals said at least one port in a closed condition thereof; wherein said spring member is resiliently movable into a second, open condition, in which said band-shaped spring member is displaced from said circumferential wall for permitting discharge of fluid from said at least one port, under pressure exerted by fluid in said at least one port; wherein said at least one flow passage through the wall of the injector body connects said flow of fluid with a drain passage, said drain passage extending through said wall of the injector body from said central bore at a second side of said plunger, and wherein said valve spring member is mounted in a position enabling blocking said flow of fluid from said passage means to said drain passage without blocking drainage flow from said central bore at said second side of said plunger through said drain passage.

39. A high pressure fuel injector according to claim 38, wherein said plunger is an intermediate plunger that is mounted for reciprocal movement in said central bore between an upper plunger and a lower plunger, said valve body being formed by said intermediate plunger.

40. A high pressure fuel injector according to claim 38, wherein said valve body is formed by said injector body.

41. A high pressure fuel injector according to claim 38, further comprising a lower plunger mounted for reciprocal movement within said central bore, wherein said pressure actuated valve means is operative to drain fluid from a chamber in said central bore, both when the pressure of fluid therein exceeds a first predetermined pressure during an injection stroke movement of said lower plunger toward said injection orifice and at an end of said injection stroke movement.

42. A high pressure fuel injector according to claim 41, wherein said pressure actuated valve means comprises first and second band-shaped resilient valve spring members; wherein said first valve spring member is operative to regulate the pressure at which said fluid is drained from said chamber when the pressure of the fluid therein exceeds a first predetermined pressure during an injection stroke movement of said lower plunger toward said injection orifice and wherein said second valve spring member is operative to regulate the pressure at which said fluid is drained from said chamber at the end of said injection stroke movement.

43. A high pressure fuel injector according to claim 42, wherein said plunger having passage means therethrough is an intermediate plunger mounted for reciprocal movement in said central bore between an upper plunger and said lower plunger, and said intermediate plunger serving as the valve body upon which said first valve spring is mounted.

44. A high pressure fuel injector according to claim 43, wherein said injector body serves as the valve body upon which said second valve spring is mounted.

45. A high pressure fuel injector according to claim 42, wherein said injector body serves as the valve body upon which said first and second valve spring members are mounted.

* * * * *

UNITED STATES PATENT AND TRADEMARK OFFICE
CERTIFICATE OF CORRECTION

PATENT NO. : 5,275,337

DATED : January 4, 1994

INVENTOR(S) : Oldrich S. KOLARIK and Jeffrey L. CAMPBELL

It is certified that error appears in the above-identified patent and that said Letters Patent is hereby corrected as shown below: Col. 17, line 45

In Claim 29, line 21, after "communicating", please insert the following: --with a flow passage formed through said valve body, and a band-shaped resilient valve spring member mounted over the circumferential wall of the valve body; wherein said spring member seals said at least one port in a closed condition thereof; and wherein said spring member is resiliently movable into a second, open condition, in which said band-shaped spring member is displaced from said circumferential wall for permitting discharge of fluid from said at least one port, under pressure exerted by fluid in said at least one port; wherein said circumferential wall has a first circumferential configuration and said band-shaped valve spring member has a second, different, circumferential configuration from that of the circumferential wall, the configuration of the band-shaped spring member, in said first, closed condition thereof, matching the at least one surface area of the circumferential wall in an area in which at least one port is formed, and being spaced from portions of said circumferential wall circumferentially on both sides of said at least one surface area relative to

UNITED STATES PATENT AND TRADEMARK OFFICE
CERTIFICATE OF CORRECTION

PATENT NO. : 5,275,337
DATED : January 4, 1994
INVENTOR(S) : Oldrich S. KOLARIK and Jeffrey L. CAMPBELL It is certified that error appears in the above-indentified patent and that said Letters Patent is hereby corrected as shown below:

said at least one port; said valve spring member being displaceable between said opened and closed conditions by bending thereof.--

Signed and Sealed this

Nineteenth Day of March, 1996

Attest:

BRUCE LEHMAN

Attesting Officer

Commissioner of Patents and Trademarks